United States Patent
Lai et al.

(10) Patent No.: US 8,221,247 B2
(45) Date of Patent: Jul. 17, 2012

(54) TRANSMISSION DEVICE HAVING OVERLOAD PROTECTION SUBASSEMBLY

(75) Inventors: Jin-Shi Lai, Shenzhen (CN); Song-Ling Yang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 293 days.

(21) Appl. No.: 12/613,545

(22) Filed: Nov. 6, 2009

(65) Prior Publication Data

US 2010/0170763 A1 Jul. 8, 2010

(30) Foreign Application Priority Data

Jan. 7, 2009 (CN) .......................... 2009 1 0300103

(51) Int. Cl.
*F16D 27/01* (2006.01)
*F16D 7/00* (2006.01)

(52) U.S. Cl. .......................................... 464/29; 464/30

(58) Field of Classification Search .................... 464/29, 464/30; 310/103, 105; 192/54.4, 84.3; 411/353, 411/517, 530

See application file for complete search history.

(56) References Cited

U.S. PATENT DOCUMENTS

| | | | | |
|---|---|---|---|---|
| 1,357,341 A | * | 11/1920 | Novontny | |
| 2,929,477 A | * | 3/1960 | Rodriguez et al. | |
| 3,240,304 A | * | 3/1966 | Wickersham | 310/103 |
| 4,114,900 A | * | 9/1978 | Wiese | |
| 4,651,856 A | * | 3/1987 | Skrobisch | 464/29 |
| 4,808,869 A | * | 2/1989 | Kopp | 310/103 |
| 4,974,706 A | * | 12/1990 | Maji et al. | 464/29 |
| 6,241,616 B1 | * | 6/2001 | Lightcap | |
| 6,478,681 B1 | * | 11/2002 | Overaker et al. | 464/29 |
| 2007/0261868 A1 | * | 11/2007 | Gross | |
| 2009/0218753 A1 | * | 9/2009 | Kramer | 310/103 |
| 2010/0055221 A1 | * | 3/2010 | Hein | |

* cited by examiner

*Primary Examiner* — Gregory Binda
*Assistant Examiner* — Josh Skroupa
(74) *Attorney, Agent, or Firm* — Altis Law Group, Inc.

(57) ABSTRACT

A transmission device includes a first transmission mechanism comprising a first rotatable member and a first transmission member fixed to the first rotatable member for rotating together with the first rotatable member; and a second transmission mechanism comprising a second rotatable member and a second transmission member fixed to the second rotatable member for rotating together with the second rotatable member. The second transmission member received in the first transmission member, and the second transmission member being magnetically connected with the first transmission member. When a load applied to the first transmission mechanism is less than a predetermined value of the first transmission mechanism, the first transmission member rotates together with the second transmission member by a magnetic force generated therebetween, which in turn makes the first transmission mechanism rotates with the second transmission mechanism together.

7 Claims, 7 Drawing Sheets

TRANSMISSION DEVICE HAVING OVERLOAD PROTECTION SUBASSEMBLY

BACKGROUND

1. Technical Field

The present disclosure relates to transmission devices, and particularly to a transmission device with overload protection.

2. Description of Related Art

When a transmission of a motor is overloaded, it will blow a fuse. To replace the fuse is time consuming and inconvenient.

Therefore, it is desirable to provide a transmission device which can overcome the above-mentioned problems.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

Figure 1:
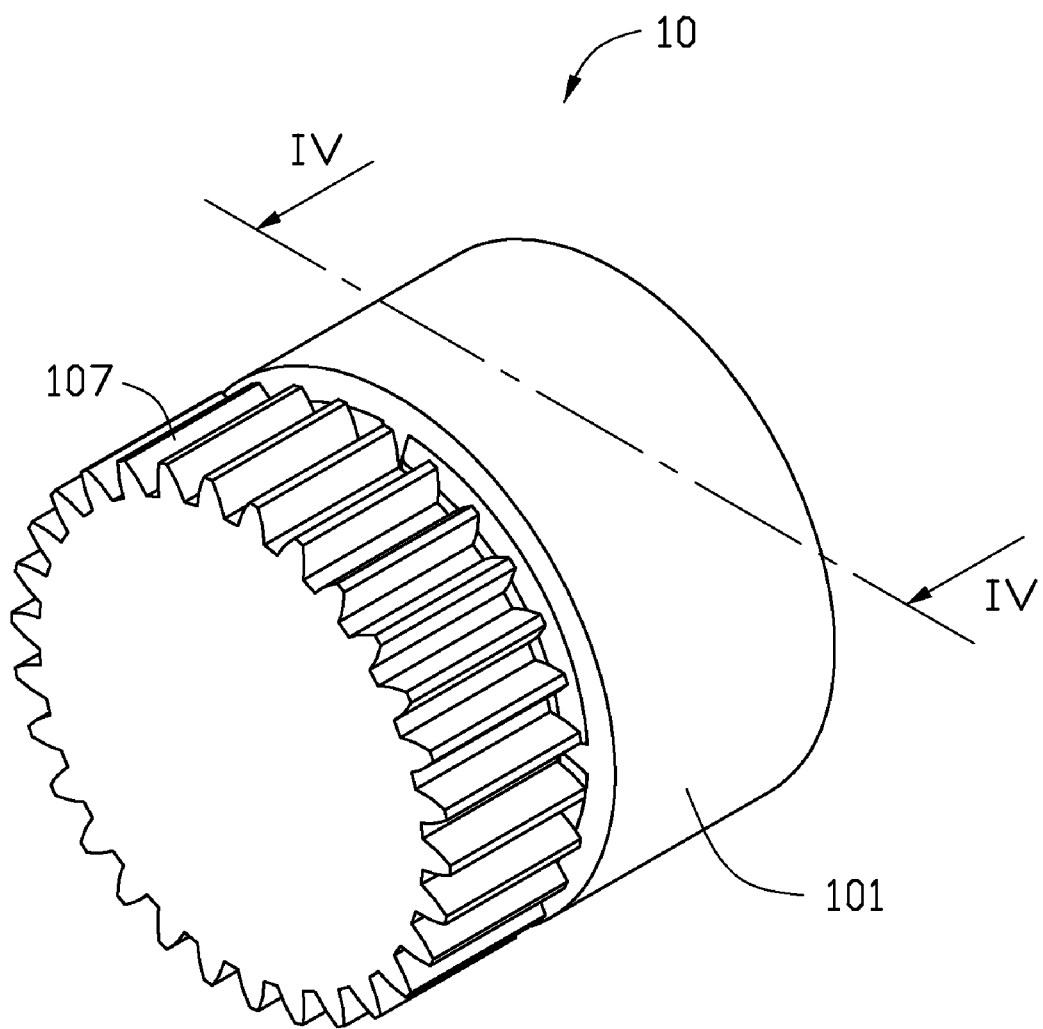
FIG. 1 is an isometric view of a transmission device according to a first exemplary embodiment.

Referring to FIG. 1, a transmission device 10 according to an exemplary embodiment includes a first transmission mechanism 101 and a second transmission mechanism 107 selectably rotatable with the first transmission mechanism 101 together. One of the first transmission mechanism 101 or the second transmission mechanism 107 is a driving mechanism, and the other one is a driven mechanism. In the embodiment, the first transmission mechanism 101 is the driving mechanism, and the second transmission mechanism 107 is the driven mechanism.

Figure 2:
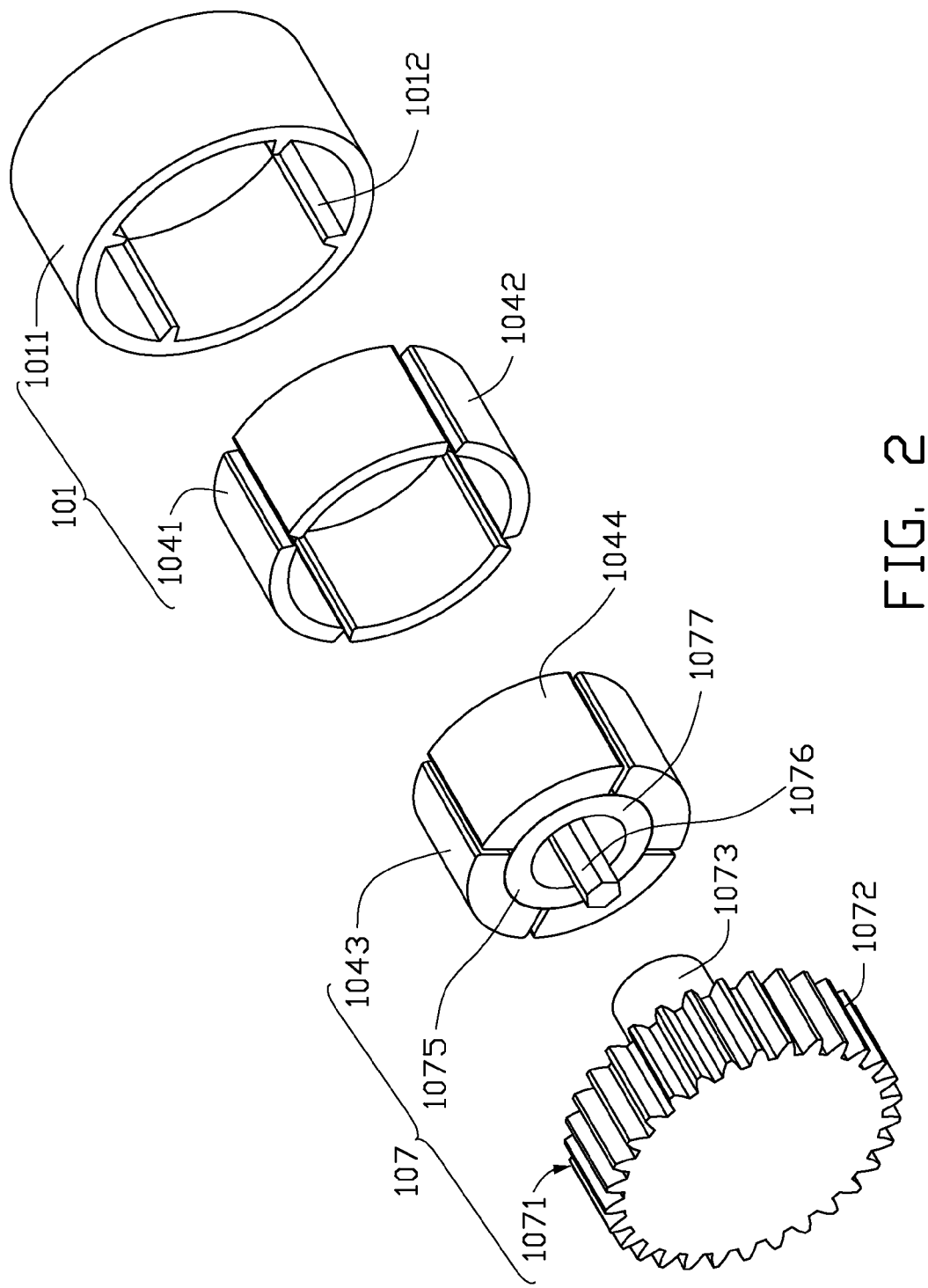
FIG. 2 is an exploded isometric view of the transmission device of FIG. 1.
Figure 3:
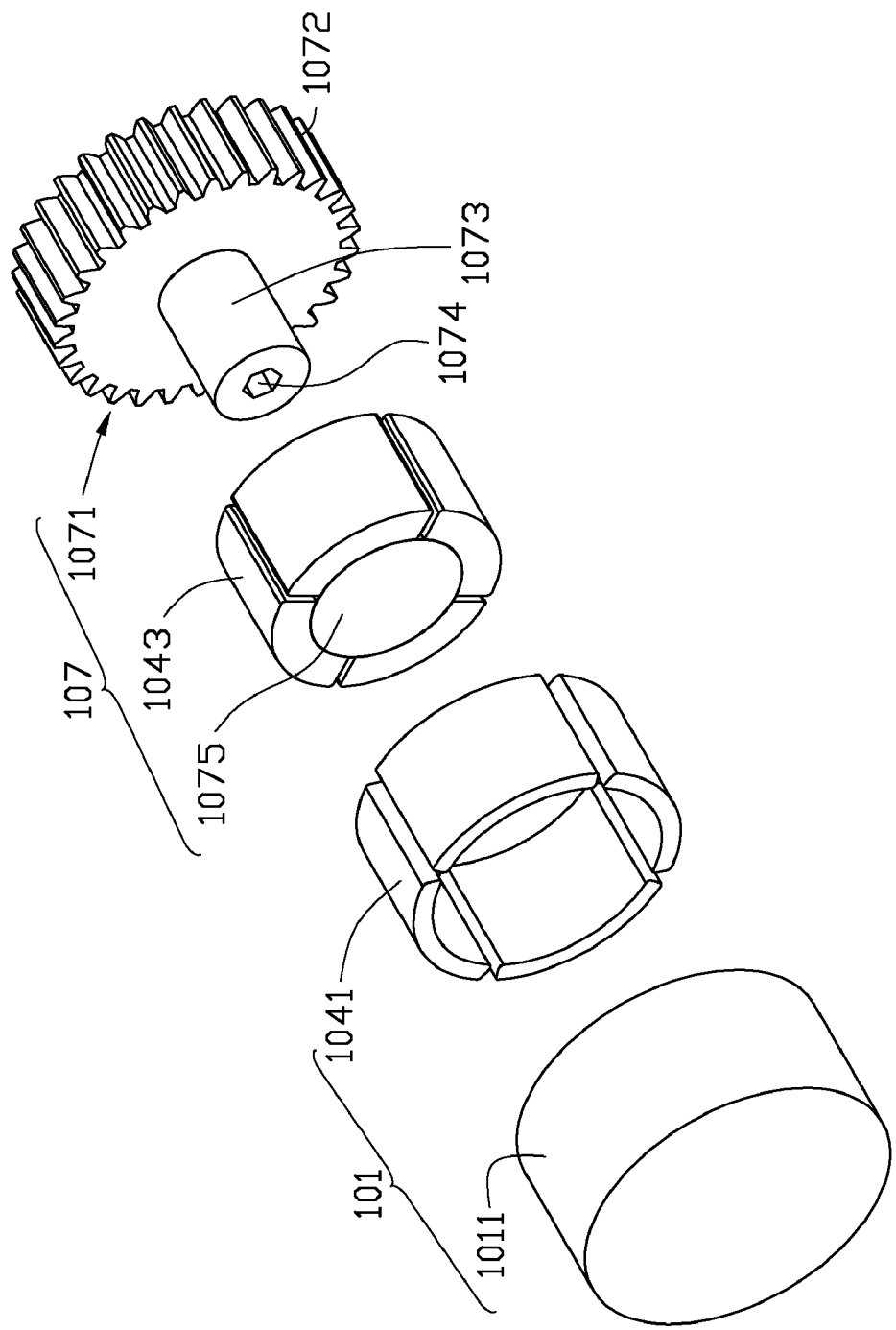
FIG. 3 is an exploded isometric view of the transmission device of FIG. 1, viewed from a reverse angle.
Figure 4:
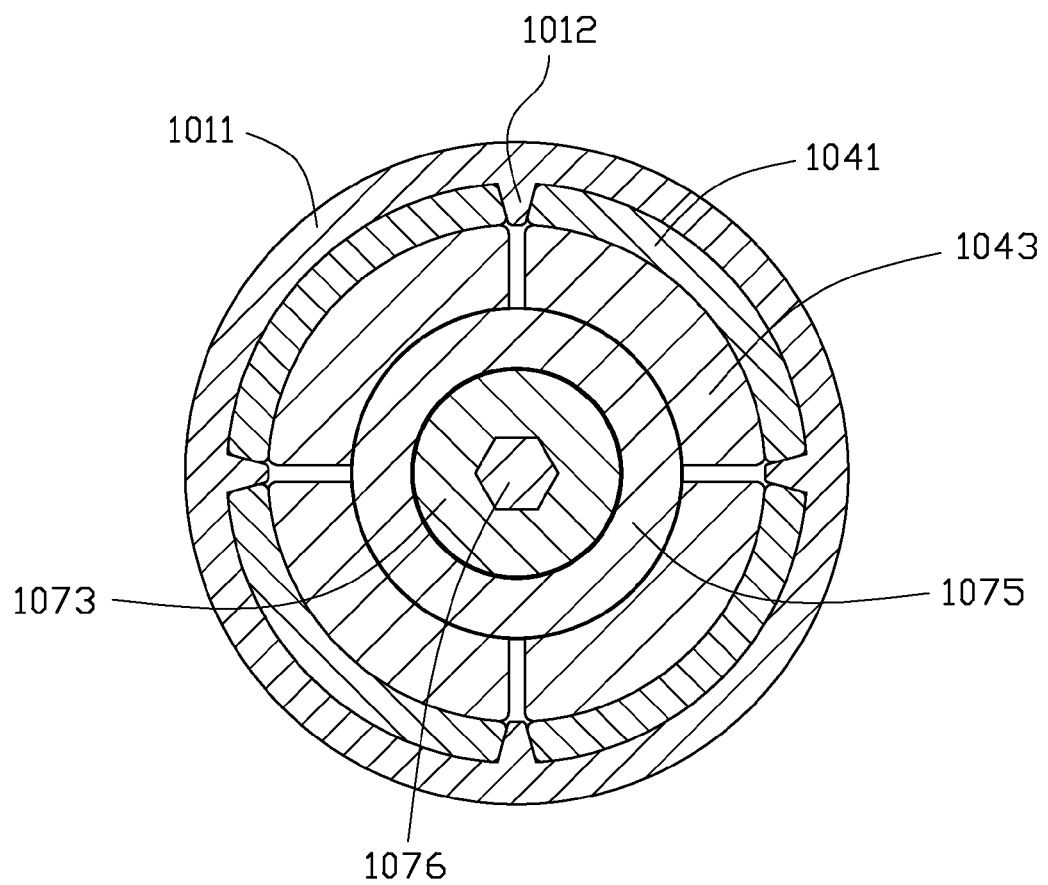
FIG. 4 is a cross-sectional view of the transmission device taken along the line IV-IV of FIG. 1.

Referring to FIGS. 2 and 3, the first transmission mechanism 101 includes a first rotatable member 1011 and a first transmission member 1041 disposed in the first rotatable member 1011. The first rotatable member 1011 is hollow. Four spacing portions 1012 are disposed in the inner surface of the first rotatable member 1011 at uniform intervals. Each of the four spacing portions 1012 is substantially a ridge. The first transmission member 1041 includes four first permanent magnets 1042. The four first permanent magnets 1042 is received in the first rotatable member 1011. Each of the four first permanent magnets 1042 is fixed between adjacent spacing portions 1012 correspondingly. A cross section of each of the first permanent magnets 1042 is arc-shaped.

The second transmission mechanism 107 includes a second rotatable member 1071, a fixing member 1075, and a second transmission member 1043. The second rotatable member 1071 includes a gear 1072 and a pivot shaft 1073 fixed on the gear 1072. A non-circular pivot hole 1074 in an end of the pivot shaft 1073 away from the gear 1072.

The fixing member 1075 includes a cylindrical fixing portion 1077 and a polygonal positioning portion 1076 disposed on the fixing portion 1077. The polygonal positioning portion 1076 is insertable into the polygonal fixing hole 1074 to prevent the fixing member 1075 from rotating with respect to the second rotatable member 1071.

The second transmission member 1043 also includes four second permanent magnets 1044. The four second permanent magnets 1044 are fixed on the outer surface of the fixing member 1075 at a uniform interval. The four second permanent magnets 1044 face the four first permanent magnets 1042, and attract each other correspondingly. The polarity on the portion of the four second permanent magnets 1044 facing each other is opposite to that of each of the four first permanent magnets 1042. Thus, creating attracting magnetic forces between the four second permanent magnets 1044 and the four first permanent magnets 1042. The attracting magnetic forces are set according to the predetermined value of the transmission device 10. A cross sectional of each of the second permanent magnets 1042 is arc-shaped.

In the embodiment, both of the second transmission member 1043 and the first transmission member 1041 are magnets and attracts each other correspondingly. In the other embodiments, one of the second transmission member 1043 or the first transmission member 1041 may be an attracted member, the other one being an attracting member. That is, one of the second transmission member 1043 and the first transmission member 1041 is a magnet, and the other one is ferrous metal, such as iron.

When a load of transmission device 10 is less than the critical load of the transmission device 10, the attracting magnetic force is larger than a torsional force between the first rotatable member 1011 and the second rotatable member 1071. Therefore, the first transmission mechanism 101 and the second transmission mechanism 107 rotate together.

When an actual load of transmission device 10 is larger than the predetermined value of the transmission device 10, the attracting magnetic force is smaller than a torsional force between the first rotatable member 1011 and the second rotatable member 1071. The first transmission mechanism 101 overcomes the attracting magnetic forces and rotates with respect to the second transmission mechanism 107. In this manner, the first transmission member 1041 and the second transmission member 1071 prevent the first transmission mechanism 101 from damages when overloaded.

Figure 5:
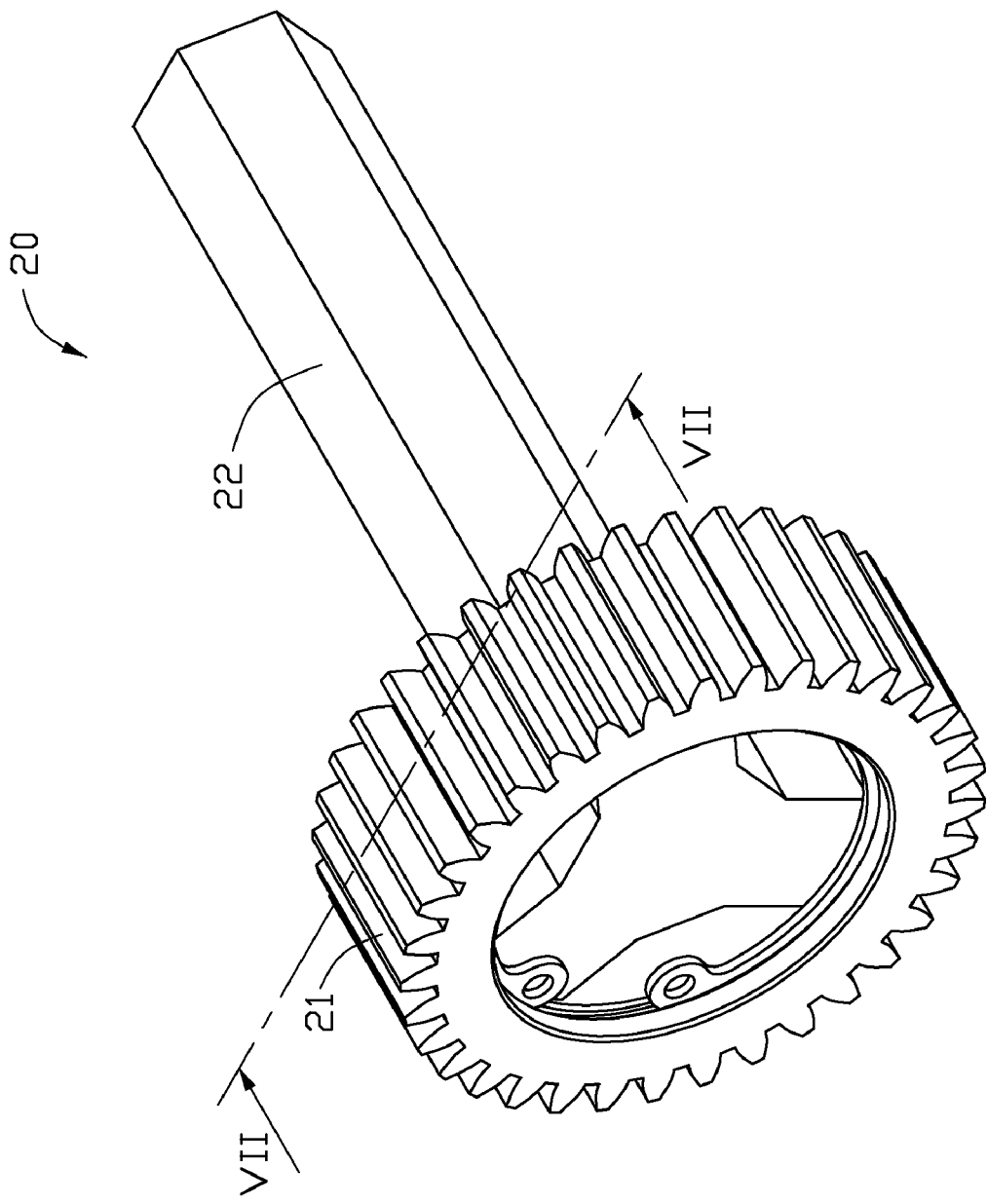
FIG. 5 is an isometric view of a transmission device according to a second exemplary embodiment.

Referring to FIG. 5, an isometric view of the transmission device 20 in accordance with the second exemplary embodiment. The transmission device 20 includes a first transmission mechanism 21 and a second transmission mechanism 22 capable of rotating with the first transmission mechanism 21 together.

Figure 6:
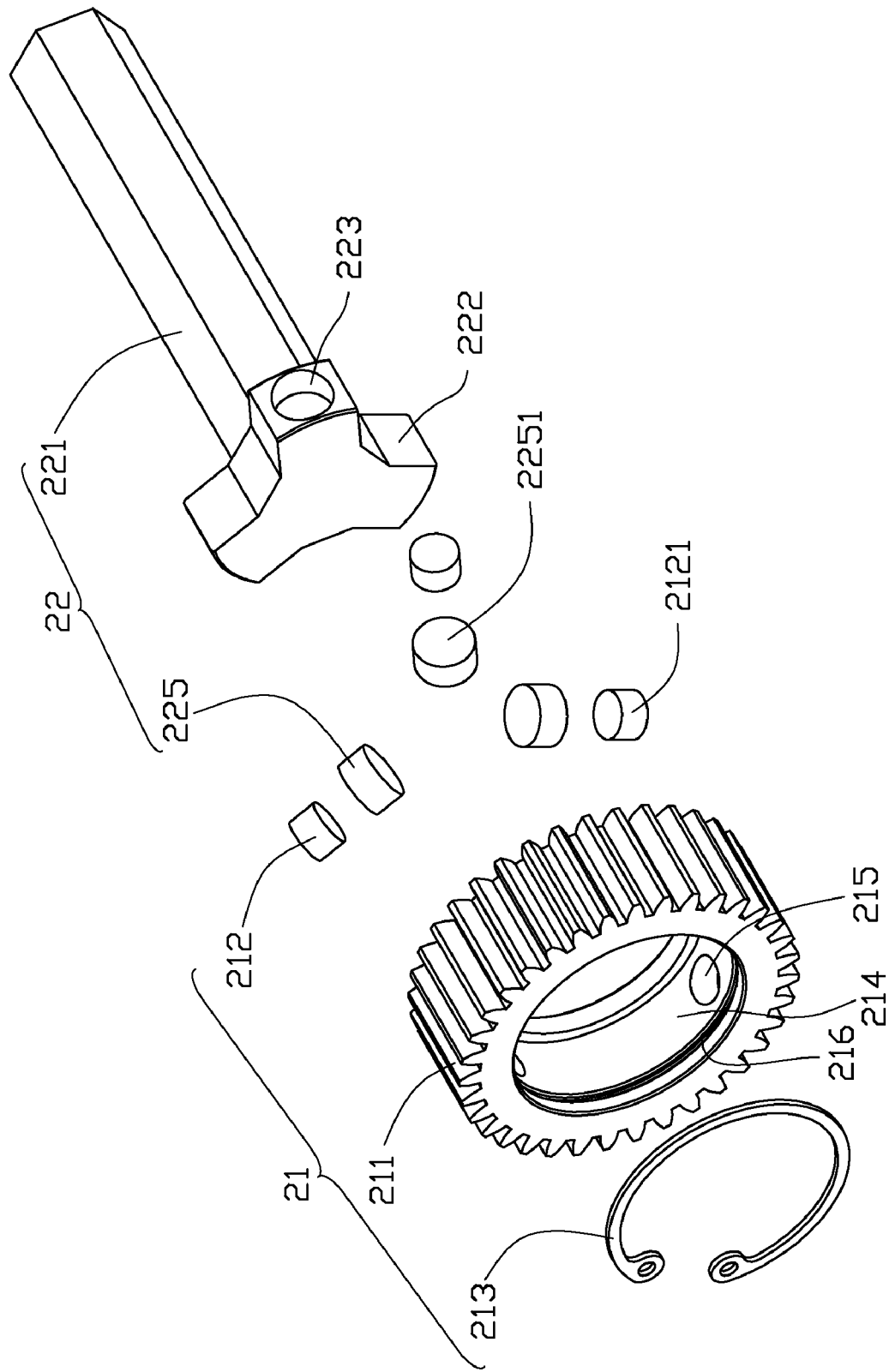
FIG. 6 is an exploded isometric view of the transmission device of FIG. 5.
Figure 7:
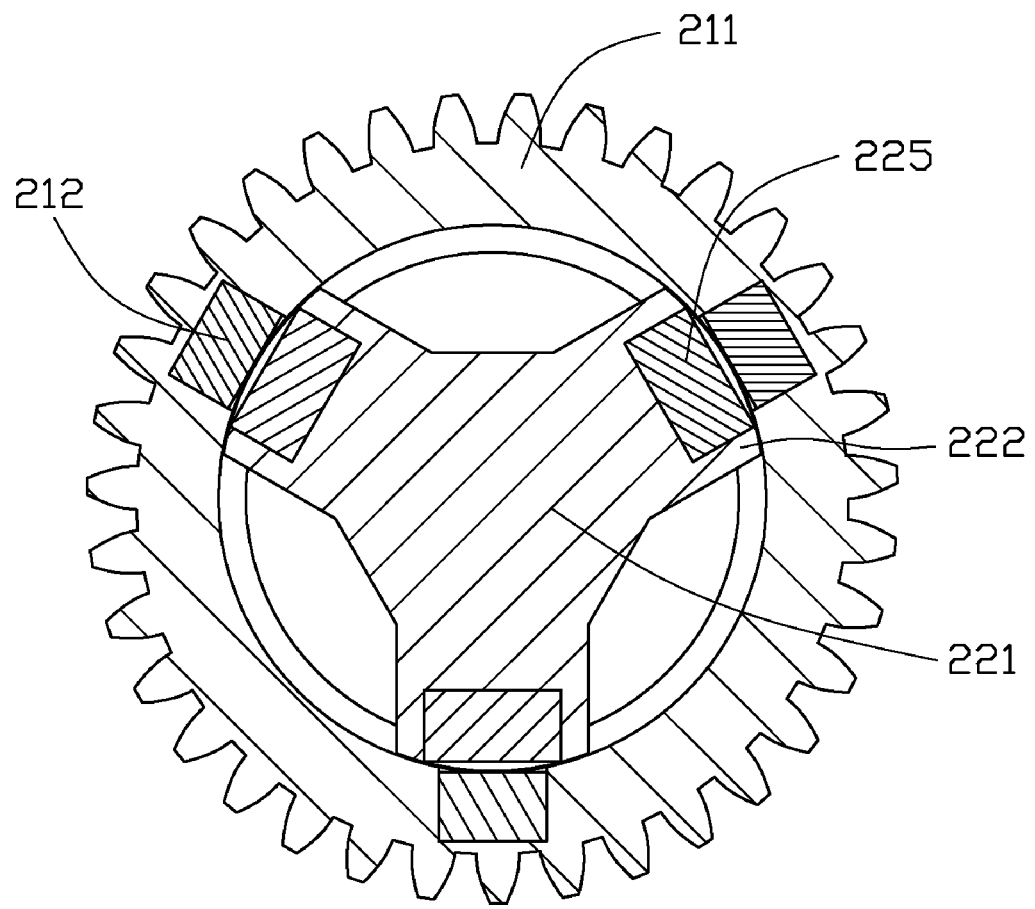
FIG. 7 is a cross-sectional view of the transmission device taken along the line VII-VII of FIG. 5.

Further referring to FIG. 6, the first transmission mechanism 21 includes a first rotatable member 211, a first transmission member 212, and a clipping member 213. The first rotatable member 211 is a gear defining a through hole 214. The through hole 214 is used for receiving a part of the second transmission mechanism 22. Three receiving holes 215 are defined in the inner surface of the first rotatable member 211. The three receiving holes 215 are aligned at regular intervals, and communicate with the through hole 214. A circular receiving slot 216 is also defined in the inner surface of the first rotatable member 211, and communicates with the through hole 214. The circular receiving slot 216 is located at one side of the three receiving holes 215.

The first transmission member 212 includes three first permanent magnets 2121. The three first permanent magnets 2121 are received in the three receiving holes 215 correspondingly. The clipping member 213 is substantially C-shaped. A portion of the clipping member 213 is fixed in the circular receiving slot 216, and the other portion is received in the through hole 214 for preventing the second transmission mechanism 22 from passing through the through hole 214. In the embodiment, the clipping member 213 is a snap ring.

The second transmission mechanism 22 includes a second rotatable member 221 and a second transmission member 225 fixed on the second rotatable member 221. One end of the second rotatable member 221 is inserted into the through hole 214 of the first rotatable member 211. Three fixing portions 222 corresponding to the three receiving holes 215 are disposed on the second rotatable member 221. Each of three fixing portions 222 defines a positioning hole 223 facing the three receiving holes 21 correspondingly.

The second transmission member 225 includes three second permanent magnets 2251. The three second permanent magnets 2251 are received in the three positioning holes 223 correspondingly. A size of each of the three second permanent magnets 2251 is larger than that of each of the three first permanent magnets 2121. The end of the second rotatable member 221 is received in the through hole 214 without the three second permanent magnets 2251 and the three first permanent magnets 2121 contacting each other. Attracting magnetic forces are existed between the three second permanent magnets 2251 and the three first permanent magnets 2121. The Attracting magnetic forces are set according to the predetermined value.

In the embodiment, the number of the receiving holes 215 and the positioning holes 223 is three, in other embodiments, the number of the receiving holes 215 and the positioning holes 223 may be one, two, four, and more.

When an actual load of transmission device 20 is smaller than the predetermined value of the transmission device 20, the first transmission mechanism 21 and the second transmission mechanism 22 rotate together under the attracting magnetic forces between the three second permanent magnets 2251 and the three first permanent magnets 2121. When an actual load of transmission device 20 is larger than the predetermined value of the transmission device 20, the attracting magnetic forces between the three second permanent magnets 2251 and the three first permanent magnets 2121 are smaller than a torsional force between the first rotatable member 211 and the second rotatable member 221. The first transmission mechanism 21 overcomes the attracting magnetic forces and rotates with respect to the second transmission mechanism 22. In this manner, the first transmission member 212 and the second transmission member 225 prevent the first transmission mechanism 21 from damaging when under overloaded.

It is to be understood, however, that even though numerous characteristics and advantages of the present disclosure have been set forth in the foregoing description, together with details of the structure and function of the present disclosure, the present disclosure is illustrative only, and changes may be made in detail, especially in matters of shape, size, and arrangement of parts within the principles of the present disclosure to the full extent indicated by the broad general meaning of the terms in which the appended claims are expressed.

What is claimed is:

1. A transmission device, comprising:
a first transmission mechanism comprising a sleeve-shaped first rotatable member, a first transmission member having a plurality of first permanent magnets fixed to the first rotatable member for rotating together with the first rotatable member, and a plurality of ridge-shaped spacing portions disposed on an inner surface of the first rotatable member to space the plurality of first permanent magnets;
a second transmission mechanism comprising a second rotatable member and a second transmission member fixed to the second rotatable member for rotating together with the second rotatable member, the second transmission member received in the first transmission member and having a plurality of second permanent magnets corresponding to the plurality of first permanent magnets for being magnetically connected with the first transmission member, when an actual load applied to the first transmission mechanism is less than a predetermined value of the first transmission mechanism, the first transmission member rotates together with the second transmission member by a magnetic force generated therebetween, which in turn makes the first transmission mechanism rotate with the second transmission mechanism together.

2. The transmission device of claim 1, wherein a size of each of the plurality of second permanent magnets is larger than that of each of the plurality of first permanent magnets.

3. The transmission device of claim 1, wherein the plurality of first permanent magnets are fixed on the inner surface of the first rotatable member at a uniform interval.

4. The transmission device of claim 1, wherein cross sectional of each of the first permanent magnets and the second permanent magnets is arc-shaped.

5. The transmission device of claim 1, wherein a number of the first permanent magnets is three or four, a number of the second permanent magnets is three or four correspondingly.

6. The transmission device of claim 1, wherein the second transmission mechanism further comprises a fixing member fixed to the second rotatable member, the second transmission member is fixed on the fixing member.

7. The transmission device of claim 6, wherein the second rotatable member defines a polygonal fixing hole, the fixing member comprises a polygonal positioning portion capable of being inserted into the polygonal fixing hole for fixing the fixing member to the second rotatable member.

* * * * *